Jan. 2, 1968 J. V. FOA 3,361,336
METHOD OF ENERGY SEPARATION AND APPARATUS
FOR CARRYING OUT THE SAME
Filed June 23, 1964 4 Sheets-Sheet 1

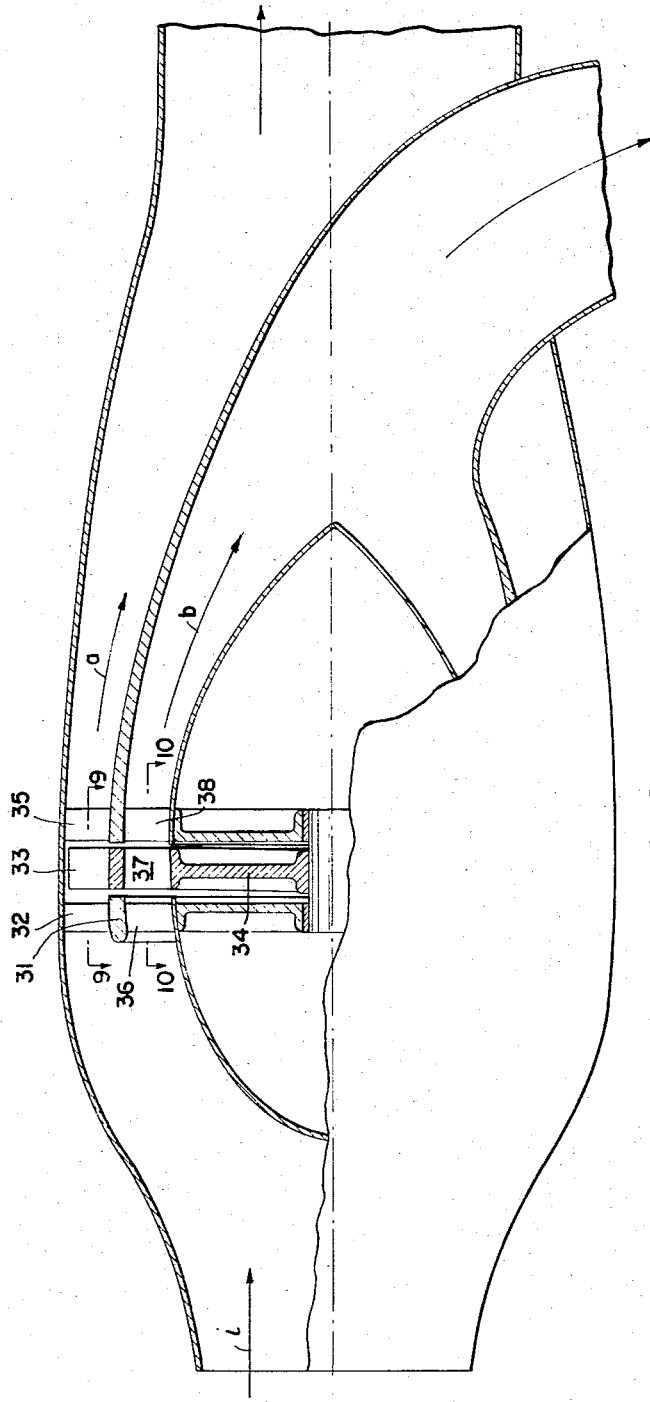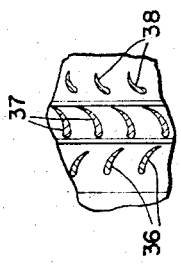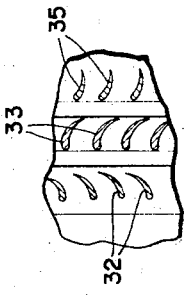

United States Patent Office 3,361,336
Patented Jan. 2, 1968

3,361,336
METHOD OF ENERGY SEPARATION AND APPARATUS FOR CARRYING OUT THE SAME
Joseph V. Foa, 33 Point View Drive, Troy, N.Y. 12180
Filed June 23, 1964, Ser. No. 377,214
32 Claims. (Cl. 230—1)

This invention relates to a method and apparatus for carrying out the same in which the total head or total specific enthalpy of one or more portions of a flow of a fluid is increased at the expense of the corresponding quantities in other portions of the same flow, through direct and nondissipative exchanges of energy. More particularly, it relates to a method and apparatus whereby a flow even though it may initially be substantially homogeneous is divided into separate flows at different energy levels each of which may also be substantially homogeneous.

The only known existing apparatus for the transverse redistribution of energy within an initially homogeneous flow is the Ranque-Hilsch tube, in which, however, the transfer is effected entirely through the dissipative action of viscous stresses and irreversible transport processes. In contrast, I have found that such energy redistribution can be effected far more efficiently in a manner which depends on the nondissipative action of pressure forces.

In my Patent No. 3,046,732 granted on July 31, 1962, there is set forth a method and apparatus in accordance with which two flows of different energy levels interact so that energy is transferred from the flow of higher to the flow of lower energy level independent of such dissipative mechanisms as mixing, heat transfer or diffusion. The interaction is carried out so that in a frame of reference moving relative to an observer and in which the two interacting flows are stationary there is no transfer of energy between the flows while in the frame of reference of the observer (in which useful work is to be done) there is a net transfer of energy from the higher energy (primary) flow to the lower energy (secondary) flow. In carrying out such a nondissipative energy transfer between the two flows, the primary and secondary flows are interacted in an interaction space and for many purposes, are thereafter separated before such dissipative transport phenomena as mixing, heat transfer and diffusion can take place to any substantial extent.

I have discovered yet another mode of direct and nondissipative energy exchange in accordance with which, instead of bringing flows of different energy levels together to effect a transfer of energy between them (in the frame of reference in which useful work is to be done), I separate an initial flow which may be homogeneous into two or more subflows having different energy levels, independently of viscous stresses and dissipative transport processes. Here, again, the process to be fully appreciated is considered with respect to two frames of reference between which there is relative motion.

Conveniently, one frame of reference ($F_o$) may be taken as fixed to the casing of an apparatus in which the process is carried out while the second frame of reference ($F_s$) is moving relative to the first but is fixed to the flow field as a whole which is in motion relative to the casing and the first frame of reference. For example, considering the case of a rotor turning on its axis within a casing, a flow emerging from a peripheral nozzle formed on the rotor may be seen to be moving relative to the casing but the flow as a whole is also seen to be stationary in a frame of reference ($F_s$) fixed to and moving with the nozzle.

It is, therefore, a principal object of this invention to provide a novel method and apparatus by means of which an initial flow is divided into separate flows which have been brought to different energy levels through internal exchanges characterized by an efficiency which is substantially higher than that hitherto attainable.

A further object of this invention is to provide an improved method and apparatus for pumping, lifting, or compressing of fluids of all kinds, and for heating, cooling, refrigerating, air-conditioning, and related purposes.

In carrying out my method, the redistribution of energy and the separation of the various portions or "subflows" from the original flow are effected simultaneously, by deflecting the various subflows to form differently directed streams in distinct spaces without substantial mixing therebetween, and by moving these streams concurrently in their respective spaces, either all at the same velocity or at velocities which are in fixed relationships to one another. The distinct spaces in which the original flow is discharged then act as sources of separate flows, some of which will be at a higher energy level and others at a lower energy level than the original flow. While the distinct spaces may be separated from one another by walls formed of abiding material, it is sufficient for the purposes of the present invention that the higher and lower energy flows do not intermix to any substantial extent. Thus, two flows, one at a higher and the other at a lower energy level may move in side-by-side relation in spaces which intercommunicate so long as there is no substantial mixing therebetween.

Further objects as well as advantages of the present process as well as the apparatus for carrying out the same will be apparent from the following description and the accompanying drawings, in which:

FIGURES 7 and 8 are side elevational views, partially in section, of yet further embodiments of apparatus suitable for carrying out the present method;

Figure 11:
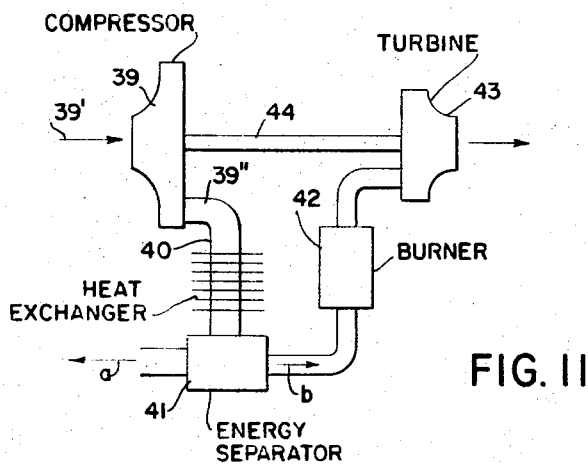
Figure 12:
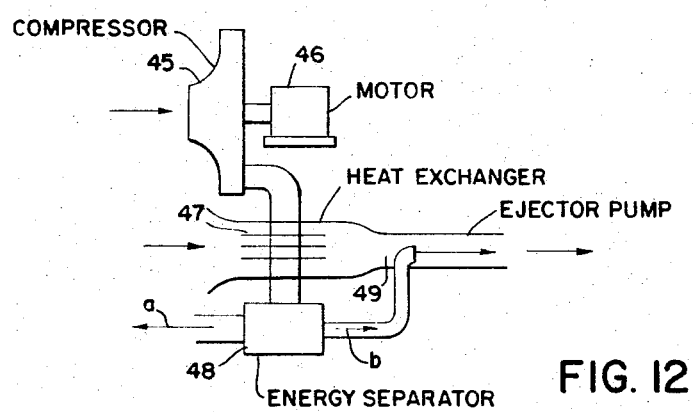
Figure 13:
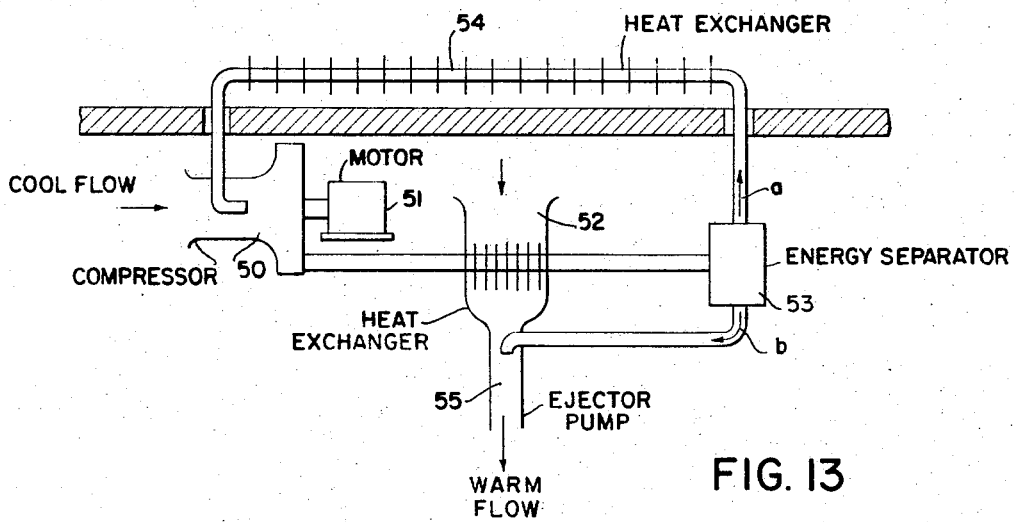

FIGURES 9 and 10 are sectional views through the lines 9—9 and 10—10, respectively, of FIGURE 8;

FIGURES 11 and 12 are diagrammatic illustrations of the application of this invention to air-conditioning systems;

FIGURE 13 is a diagrammatic illustration of a heat pump system utilizing the present invention.

As will be made evident, the present method as well as the apparatus for carrying out the same lend themselves to a wide variety of uses. It is to be understood that the term "fluid" is used herein, and is intended to include, in addition to gases and liquids, any suspension or aggregate that can be made to flow.

Figure 1:
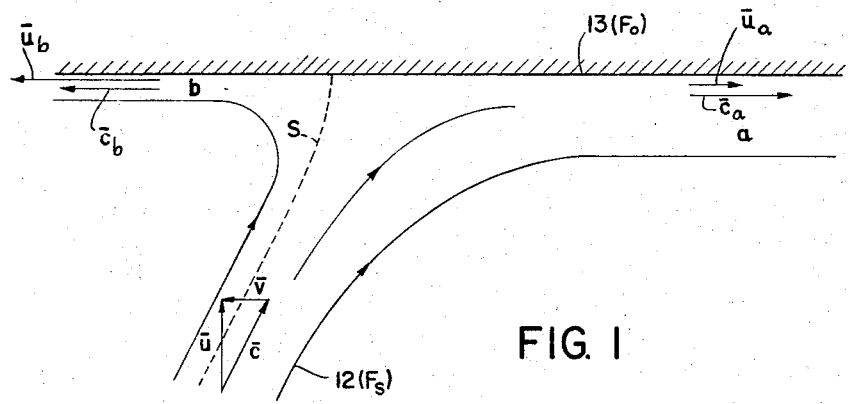
FIGURE 1 is a diagrammatic representation of the mechanism of energy re-distribution in accordance with this invention, for a two-dimensional flow system.

Turning now to the drawings, FIGURE 1 shows a two-dimensional initially homogeneous jet 12 impinging on a fixed flat wall 13. The flow field is stationary in a frame of reference $F_s$. Body forces, viscous stresses, and heat exchanges with the surroundings are assumed to be negligible here for the purpose of simplification. It is known that under these conditions the jet divides into two oppositely directed streams $a$ and $b$, as shown. The "stagnation stream surface" $s$ is the surface of contact between the two flows in the original stream. Under the stipulated conditions, the specific stagnation enthalpy (or total head, if the fluid is incompressible) is, in frame of reference $F_s$, the same in the deflected flows as in the original stream. However, in every other frame of observation the two flows will appear to acquire different energy levels as they become separated from one another. Let $\bar{c}_a$ and $\bar{c}_b$ denote the particle velocity vectors in the deflected flows with $\bar{c}$ denoting the particle velocity vector relative to $F_s$, and let $\bar{u}_a$, $\bar{u}_b$ and $\bar{u}$ denote the corresponding velocity vectors as measured in a frame or reference $F_o$, relative to which the same flow field is moving at a velocity $\bar{V}$. Then, $\bar{u}=\bar{c}+\bar{V}$, hence $$\tfrac{1}{2}(u_b^2-u_a^2)=\tfrac{1}{2}(c_b^2-c_a^2)+(\bar{c}_b-\bar{c}_a)\cdot\bar{V} \qquad (1)$$

where the dot denotes a scalar product. Since $\bar{c}_a$ and $\bar{c}_b$ have different orientations, the term $(\bar{c}_b-\bar{c}_a)\cdot\bar{V}$ never vanishes unless $\bar{V}$ is either zero or normal to the deflected streams. Except for these two trivial cases, which will be excluded. Equation 1 shows that the specific kinetic energies of the two deflected flows differ from one another by unequal amounts in the two frames of reference. Now, the thermodynamic states are invariant with respect to changes of the frame of reference. It follows, then, that the specific stagnation enthalpies (or total heads) of the deflected flows, being equal in $F_s$, must be unequal in $F_o$. Since the original stream 12 is seen as a homogeneous stream in every coordinate system, it follows that energy is transferred, in frame of reference $F_o$, from one portion to the other of this stream as the two portions are deflected from a common orientation to different orientations. The energy exchanged is the work done by the pressure forces that are exerted on the moving contact surface $s$. Therefore, the energy transfer is direct.

Figure 2:
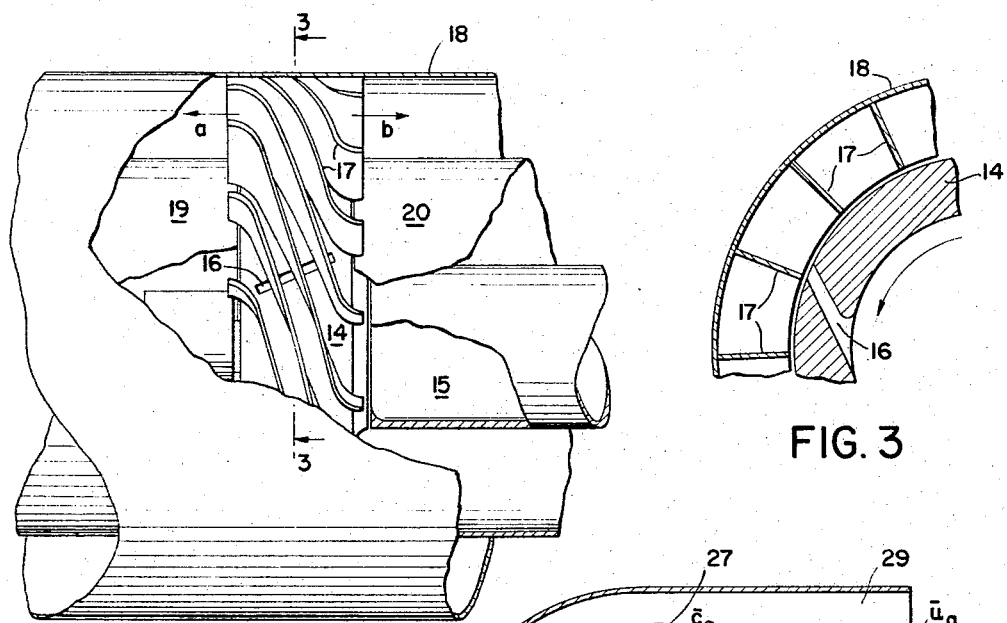
FIGURE 2 is a side elevational view, partially in section and broken away for convenience, of an apparatus constructed in accordance with the present invention.
Figure 3:
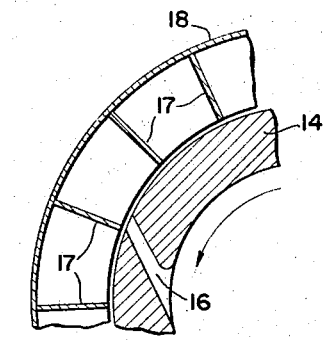
FIGURE 3 is a fragmentary sectional view along the line 3—3 of FIGURE 2.

FIGURES 2 and 3 show a freely rotatable rotor 14 into which a homogeneous flow of a fluid is fed under pressure through a stationary supply duct 15, and out of which the same fluid issues, through nozzles such as peripheral discharge nozzles 16 formed in rotor 14, into a space which is at a pressure lower than the total pressure of the supply flow. This space is partitioned by stationary vanes 17 fixed to external casing 18 and forming helical channels therebetween, within which the discharged flow from each of the nozzles 16 is deflected in the form of oppositely directed streams $a$ and $b$ as it impinges on the internal surface of the enshrouding wall 18. Vanes 17 may be turned at both ends to an axial direction, as shown in FIGURE 2, to eliminate the whirl of the discharging flows $a$ and $b$. As shown, the nozzles 16 extend normal to the intermediate portions of the vanes 17 to avoid undesired turbulence. The cross-sectional shape of nozzles 16 may be elongated, as shown in FIGURE 2, or of any other shape and orientation.

In operation, the flow from nozzle 16 on impinging against the casing divides into two streams; stream $a$ which flows upward (as viewed in FIGURE 2) and serves to drive the rotor in the direction of the arrow in FIGURE 3 to carry nozzle 16 downward as viewed in FIGURE 2, and stream $b$ which flows downward in the spaces between the vanes 17 as viewed in FIGURE 2. Thus, the motion of the jets issuing from nozzles 16 and of the associated flow fields may be maintained by the reaction of the jets themselves. Flows $a$ and $b$ are extracted from the separator through the annular passages formed by walls 18, 19 and 20. In the frame of reference fixed to casing 18, the total energy of stream $b$ is higher than that of stream $a$.

Figure 4:
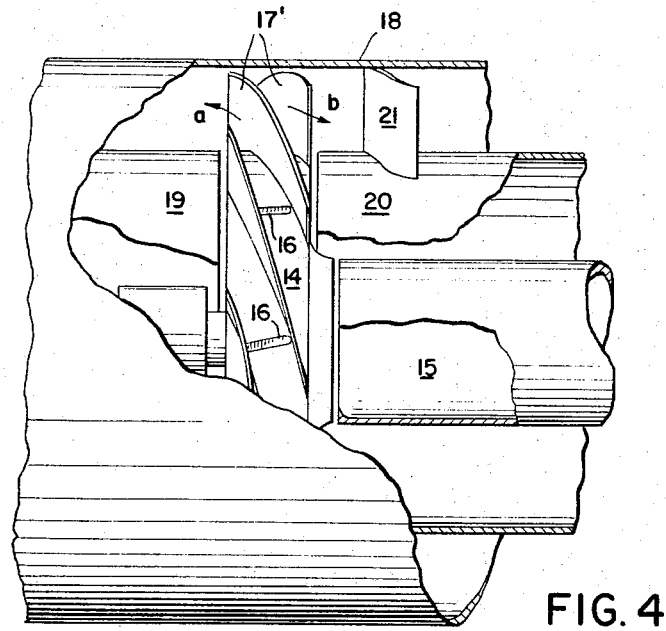
FIGURE 4 is a side elevational view, partially in section and broken away for convenience, of a further embodiment of apparatus suitable for carrying out the method of the present invention.

In FIGURE 4, there is shown an arrangement similar to that shown in FIGURES 2 and 3. The confining vanes 17' correspond to vanes 17 but here are attached to rotor 14 rather than to the enshrouding wall 18 and rotate with the rotor. Nozzles 16 are so arranged that each of them discharges into one of the channels formed by vanes 17'. The separated flows $a$ and $b$ are extracted through the annular passages formed by stationary walls 18, 19, and 20, and their whirl may be eliminated by peripherally arranged, stationary turning vanes 21, of which one is shown in the discharge passage of flow $b$.

Figure 5:
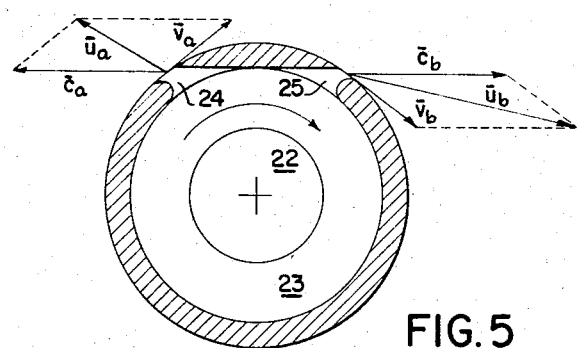
FIGURE 5 is a sectional view diagrammatically showing another form in which energy re-distribution in accordance with this invention may take place.

In the arrangement of FIGURE 5, the separation of flows $a$ and $b$ takes place inside the rotor. A fluid is fed under pressure through stationary supply duct 22 into freely rotatable rotor 23, and discharged out of the rotor through peripherally arranged nozzles 24 and 25, of which only one pair is shown. As shown in FIGURE 5, nozzles 24 and 25 do not have the same cross-sectional area, the minimum cross-sectional areas of nozzles 24 being larger than those of nozzles 25.

For the sake of simplicity, the arrangement shown is one in which the angle formed between the vectors $c_a$, $\bar{V}$ and the angle formed between the vectors $\bar{c}_b$, $\bar{V}_b$ are supplementary and the angular distance between the two nozzles is such that the velocities $\bar{c}_a$ and $\bar{c}_b$ are oppositely directed, but neither of these two conditions is necessary. Also, as in connection with FIGURE 1, the further assumption is made that the flow of the fluid fed through duct 22 is homogeneous solely for the purposes of simplifying this discussion and at the same time making it clear that energy transferred between the streams into which the fluid is divided is direct and entirely independent of mixing, diffusion and heat transfer or of any nonhomogeneous conditions in the fluid just before the separation.

The angular momentum outflow through nozzles 24 (flow $a$) is larger, in the nozzle-fixed frame of reference (frame $F_s$), than the angular momentum outflow through nozzles 25 (flow $b$). Now, by virtue of the angular momentum theorem, the net rate of outflow of angular momentum through the rotor openings—i.e., the outflow rate through the rotor discharges minus the inflow rate through the rotor inlet—must be equal to whatever positive (driving) or negative (resisting) torque may be applied to the rotor by external agents. In particular, in the absence of a driving torque and flow prerotation at the rotor inlet, and with bearing friction negligible, the total angular momentum of the issuing flows about the rotor axis, in frame of reference $F_o$, must be zero. In any case, the rotor rotates at such an angular velocity that the condition demanded by the angular momentum theorem is satisfied, thus producing the required motion of the frame of reference $F_s$ relative to the frame of reference $F_o$. The nozzle axes may be slanted out of their plane of rotation, thereby causing flows $a$ and $b$ to acquire axial velocity components in opposite directions and making possible their separate extraction as will now be described in connection with the embodiment shown in FIGURE 6.

Figure 6:
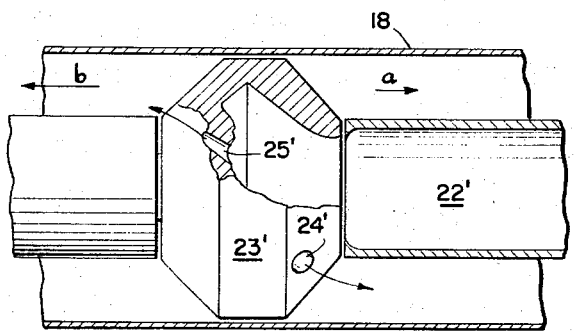
FIGURE 6 is a longitudinal sectional view, partially in elevation, of a third embodiment of apparatus for carrying out the present invention.

Referring now to FIGURE 6, freely rotatable rotor 23' is mounted within casing 18 and corresponds to rotor 23 in FIGURE 5. Nozzles 24' and 25' correspond, respectively, to nozzles 24 and 25 but are here oppositely slanted out of their plane of rotation. Fluid is fed under pressure through stationary supply duct 22' into rotor 23' and exits as separate streams through the nozzles 24' and 25'. The magnitude of the velocity of stream $b$ relative to the casing 18 is greater than that of stream $a$ as indicated by the difference in length of the axial component vectors associated therewith.

To assist in maintaining separation of the flows $a$ and $b$, the peripheral surface of the rotor 23' may be positioned to rotate in substantially fluid-tight sealing relation with the interior surface of casing 18.

The separation of the two flows may also be effected by placing the nozzles discharging flow $a$ in one plane of rotation and those discharging flow $b$ in another, and by capturing the discharges in separate collectors or volutes. The separation of the discharge spaces will also permit the maintenance of different discharge pressures for the various flows and the independent control of these pressures, through valves in the stationary discharge passages. In this manner, the mass flow ratio and the amount of energy transferred, with fixed inlet conditions, may be controlled at will over wide limits. Further control of the energy distribution can be obtained by means of stationary but adjustable prerotating vanes in the supply duct 15 or 22'.

Figure 7:
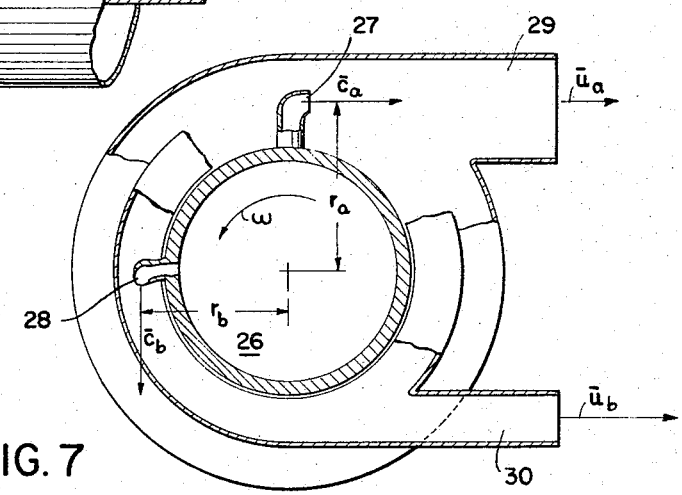

As will now be described in connection with FIGURE 7, the difference in energy level between the two flows $a$ and $b$ can be increased further by increasing the ratio $r_a/r_b$ between the moment arms of issuing flows $a$ and $b$ about the rotor axis. Freely rotatable rotor 26 receives fluid under pressure and discharges it through two pairs of peripheral nozzles 27 and 28 (of which only one is shown for each pair), nozzles 27 for the generation of de-energized flow $a$ and nozzles 28 for the generation of energized flow $b$. The minimum cross-sectional area of nozzles 27 is larger than that of nozzles 28. Furthermore, the moment arm of $\bar{c}_a$ about the rotor axis is greater than that of $\bar{c}_b$. Also, the two pairs of nozzles are placed in two different planes of rotation, thus making possible the separate capture of the two issuing flows, through collectors 29 and 30.

The number of nozzles in each group is, of course, not limited to two. In fact, each group of nozzles may be replaced by a cascade. In order to reduce total pressure losses, an annular diffuser space may be provided between the cascade exits and the collectors, with or without diffuser vanes, as is the practice in the approach to the volute of centrifugal compressors.

It is to be understood that a flow can be divided by the process of the present invention into as many flows at different energy levels as may be desired through the use of a corresponding number of groups of nozzles, or of cascades, in axially spaced planes of rotation, and with discharge orifices varying from group to group, or from cascade to cascade, in their radial position and/or in their size and/or orientation.

FIGURES 8, 9 and 10 show an alternative arrangement, which is of the axial-flow type. The original flow $i$, fed under pressure, is divided into the two concentric flows $a$ and $b$ by the annular partition 31. Flow $a$ is imparted some prerotation by guide vanes 32, then is deflected back, by vanes 33 of freely rotatable rotor 34, in a direction opposite to that of the peripheral velocity of the vanes themselves, and is finally deflected back to the axial direction by straightening vanes 35. Flow $b$ receives negative prerotation in the passages defined by guide vanes 36, is deflected in the direction of rotation of the rotor by rotor vanes 37, and is finally deflected back to the axial direction by straightening vanes 38. Flow $a$ emerges as a low-energy flow, and flow $b$ as a high-energy flow. The stationary vanes 32, 35, 36, and 38 are not necessary in all applications, but are useful in increasing the amount of energy that is transferred from flow $a$ to flow $b$. In some cases it may be desirable to make these vanes adjustable, for the purpose of control, in the same manner as the stator vanes are made adjustable in some axial-flow compressors.

It is clear that apparatus of the types described above can also be used to increase the total head of a portion of a flow of a liquid at the expense of the total head of the remaining portion:

FIGURES 11, 12, and 13 illustrate heating, cooling, and air-conditioning systems embodying the energy separators of FIGURES 2, 4, 6, 7 and 8.

The cooling system shown in FIGURE 11 comprises a compressor 39 having an inlet indicated by arrow 39' and an outlet conduit 39" communicating through heat exchanger 40 with the flow inlet of separator 41 which may take the form of any of the energy separators described in connection with FIGURES 2, 4, 6, 7 and 8. Energy separator 41 communicates with the inlet of a burner 42, the outlet of which is connected to the inlet of a turbine 43 connected by shaft 44 to compressor 39 for driving the latter. The compressor 39 takes in ambient air and compresses it to a high pressure. The compressed air is cooled in heat exchanger 40 and then enters the energy separator 41 where it is divided into two flows: flow $a$ is the de-energized, low-temperature flow, which is led to the space to be air-conditioned; whereas the high-energy flow $b$ is further energized through combustion with a fuel in burner 42 and then is expanded through turbine 43, which drives compressor 39 through shaft 44. Alternatively, burner 42 may be dispensed with, compressor 39 may be driven by a motor, and flow $b$ may be directly expanded through the turbine 43 to reduce the power requirement of the compressor.

In the cooling and/or heating system shown in FIGURE 12, a compressor 45, driven by a motor 46, takes in ambient air and compresses it to a high pressure. The compressed air is cooled in heat exchanger 47 and then enters the energy separator 48, where it is divided into two flows: the low-temperature, low-pressure flow $a$, and the high-temperature, high-pressure flow $b$. The latter is used to form the driving jet in ejector pump 49, which maintains a flow of ambient air through heat exchanger 47. Flow $a$ may be used for cooling, or the discharge of ejector 49 may be used for heating. In some cases, as in high-speed aircraft applications, the air for heating or cooling may be captured from the environment at a total pressure high enough to make the use of compressor 45, and of the associated drive, unnecessary.

In the heating system shown in FIGURE 13, a compressor 50, driven by motor 51, compresses air to a high pressure. The compressed air is cooled in heat exchanger 52, then enters the energy separator 53, where it is divided into a cold flow $a$ and a hot flow $b$. Flow $a$ is led to the external heat exchanger 54 where it absorbs heat by refrigerating the outdoor air, or the ground, or the water supplied in the mains. It is then returned indoors, where it re-enters compressor 50 together with some of the ambient air in the space which is to be heated. Flow $b$ is used to form the driving jet in ejector pump 55, which forces ambient air as a coolant over heat exchanger 52. The discharge of ejector pump 55 is the warm stream which is used for heating. Thus in addition to the energy supplied to motor 51 the space to be heated also receives the heat extracted from the outdoors.

In practice, it was found that utilizing the process and apparatus of the present invention, an initial fluid flow, at a pressure a relatively small amount above ambient and at velocity well below the speed of sound, could be separated into streams having a surprisingly large energy differential between them. Tests were carried out utilizing an energy separator constructed in accordance with FIGURE 5 but with the nozzle disposed in two different planes of rotation and using volutes 29 and 30, as shown in FIGURE 7, to collect the separate streams. The results of measurements made during three separate tests are set forth in the following table in which under P is given the ratio of the pressure of the initial fluid flow (as measured inside the rotor) to ambient pressure, V is the peripheral velocity of the rotor in feet per second, and $T_i$, $T_a$ and $T_b$ are respectively the temperatures of the initial fluid flow, the lower and the higher energy streams formed therefrom all in degrees Fahrenheit.

| Test No. | P | V=f.p.s. | $T_i$ °F. | $T_a$, °F. | $T_b$, °F. |
|---|---|---|---|---|---|
| 1 | 1.5 | 158 | 65 | 55 | 84 |
|   | 1.6 | 205 | 68 | 55 | 93 |
|   | 1.7 | 229 | 66 | 48 | 102 |
|   | 1.8 | 251 | 68 | 48 | 108 |
|   | 1.9 | 269 | 68.5 | 44.5 | 114.5 |
|   | 2.0 | 284 | 68.5 | 43.5 | 116.5 |
|   | 2.1 | 295 | 68.5 | 39 | 125.5 |
|   | 2.2 | 311 | 68.5 | 39 | 126.5 |
| 2 | 1.5 | 139.5 | 71 | 66 | 90 |
|   | 1.6 | 192 | 72 | 59 | 97 |
|   | 1.7 | 224 | 72 | 57 | 106 |
|   | 1.8 | 234 | 72 | 52 | 107 |
|   | 1.9 | 245 | 72 | 49 | 115 |
|   | 2.0 | 272 | 72 | 47 | 119 |
|   | 2.1 | 289 | 72 | 43 | 126 |
| 3 | 2.3 | 322 | 72 | 37 | 134 |
|   | 2.5 | 333 | 72 | 36 | 136 |
|   | 3.0 | 338 | 70 | 32 | 139 |

It is to be noted that the temperature differentials between streams $a$ and $b$ were readily attained without any substantial transfer of energy between them because of viscous stresses and dissipative transport processes. Thus, though temperature differentials of more than 100° F. were obtained, and even greater temperature differentials may be produced by the present invention, these temperature differentials are attained as a result of the direct transfer of energy between the streams $a$ and $b$ in the absence of any substantial or significant mixing, diffusion or heat transfer between them.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

I claim:

1. The method of forming at least two streams at different energy levels by the direct transfer of energy in a first frame of reference between portions of an initial fluid flow independently of viscous stresses and dissipative transport processes, comprising feeding in said first frame of reference an initial flow under pressure while confining and controlling the same so as to constantly form a plurality of separate streams therefrom with said streams and said initial flow at least at the points where said streams diverge from said initial flow forming a flow field in which said streams are differently directed and in which the flow velocities relative to a second frame of reference moving in a predetermined direction relative to said first frame of reference are substantially invariant with respect to time at all said points which are fixed in space in said second frame of reference, the particles in at least one of said streams having in said second frame of reference a velocity component in the direction opposite to said predetermined direction and the particles in at least another of said streams having in said second frame of reference a velocity component in said predetermined direction, utilizing the difference between the reactions of said one and said other of said streams to sustain motion of said flow field relative to said first frame of reference, whereby in said first frame of reference the kinetic energies of the particles of said one of said streams and of the other of said streams are lower and higher respectively than in said second frame of reference so that in said first frame of reference energy is transferred from the portion of said initial flow that forms said one of said streams to the portion of said initial flow that forms the other of said streams independently of mixing, diffusion and heat transfer therebetween, and separately collecting and leading at least one of said streams to a utilization space.

2. The method as set forth in claim 1 which further comprises controlling said initial flow so that successive points at which said streams diverge from said initial flow describe an annular path.

3. The method as set forth in claim 2 in which said annular path is described about an axis, said one stream is directed into a space at a predetermined radial distance from said axis, and said other stream is directed into a space at a radial distance from said axis different from said predetermined distance.

4. The method as set forth in claim 3 in which said other stream is directed into its space at a radial distance from said axis less than said predetermined distance.

5. The method as set forth in claim 3 in which said streams are all directed into said spaces so as to have a velocity component in the same direction along said axis as they enter said spaces.

6. The method as set forth in claim 1 which further comprises controlling said initial flow so that successive points at which said streams diverge from said initial flow described an annular path about an axis, advancing the fluid in said one stream in one direction along said axis away from said path, and advancing the fluid in said other stream in the opposite direction along said axis away from said path.

7. The method as set forth in claim 6 in which said one stream is directed into a space at a predetermined radial distance from said axis, and said other stream is directed into a space at a radial distance from said axis less than said predetermined distance.

8. An energy separator for forming at least two streams at different energy levels by the direct transfer of energy in a first frame of reference between portions of an initial fluid flow independently of viscous stresses and dissipative transport processes, comprising means for feeding in said first frame of reference an initial flow under pressure along a predetermined path, means along said path for confining and controlling said initial flow so as to constantly form a plurality of separate streams therefrom with said streams and said initial flow at least at the points where said streams diverge from said initial flow forming a flow field in which said streams are differently directed and in which the flow velocities relative to a second frame of reference moving in a predetermined direction relative to said first frame of reference are substantially invariant with respect to time at all said points which are fixed in space in said second frame of reference, the particles in at least one of said streams having in said second frame of reference a velocity component in the direction opposite to said predetermined direction and the particles in at least another of said streams having in said second frame of reference a velocity component in said predetermined direction, means responsive to the difference between the reactions of said one and said other of said streams for sustaining motion of said flow field relative to said first frame of reference, whereby in said first frame of reference the kinetic energies of the particles of said one of said streams and of the other of said streams are lower and higher respectively than in said second frame of reference so that in said first frame of reference energy is transferred from the portion of said initial flow that forms said one of said streams to the portion of said initial flow that forms the other of said streams independently of mixing, diffusion and heat transfer therebetween, and means for separately collecting and leading at least one of said streams to a utilization space.

9. An energy separator as set forth in claim 8 which further comprises means for controlling said initial fluid so that the successive points at which said streams diverge from said initial fluid flow describe an annular path.

10. An energy separator as set forth in claim 9 in which said annular path has an axis, and includes means for directing said one stream into a space at a predetermined radial distance from said axis, and means for directing said other stream into a space at a radial distance from said axis different from said predetermined distance.

11. An energy separator as set forth in claim 10 in which the last-mentioned means is for directing said other stream into its space at a radial distance from said axis less than said predetermined distance.

12. An energy separator as set forth in claim 10 which comprises means for so directing said streams into said spaces that each has a velocity component in the same direction along said axis as they enter said spaces.

13. An energy separator as set forth in claim 8 which further comprises means for controlling said initial fluid flow so that the successive points at which said streams diverge from said initial fluid flow describe an annular path about an axis, means for advancing the fluid in said one stream in a space in one direction along said axis away from said path, and means for advancing the fluid in said other stream in a space in the opposite direction along said axis away from said path.

14. An energy separator as set forth in claim 13 which further comprises means for directing said one stream into its space at a predetermined radial distance from said axis, and means for directing said other stream into its space at a radial distance from said axis less than said predetermined distance.

15. An energy separator for forming at least two streams at different energy levels by the direct transfer of energy in a first frame of reference between portions of an initial fluid flow independently of viscous stresses and dissipative transport processes, comprising a rotor rotatable about its axis and adapted for connection to a source of an initial fluid flow under pressure, a casing enclosing the peripheral surface of said rotor and forming an annular space therewith, at least one nozzle on said rotor communicating through the interior thereof with the source of said initial flow when said rotor is connected thereto, means in said annular space together with said casing for forming said initial flow as it exits from said nozzle into a plurality of differently directed streams while maintaining said initial flow and said streams, at least at the points where they diverge, as a flow field which is stationary in a second frame of reference fixed to said nozzle and moving therewith in a predetermined direction relative to a first frame of reference, at least one of said streams having a velocity component in the direction opposite to said predetermined direction for driving said rotor, at least another of said streams having a velocity component in said predetermined direction, and means for directing said streams into and concurrently advancing the same in spaces without substantial mixing therebetween, whereby in said first frame of reference energy is transferred from said one of said streams to the other of said streams independently of mixing, diffusion and heat transfer therebetween.

16. An energy separator as set forth in claim 15 in which said means in said annular space comprises a plurality of vanes disposed in spaced annular array about the periphery of said rotor and extending between the same and said casing with said vanes extending substantially parallel one with the other and inclined to the plane of rotation of said rotor.

17. An energy separator as set forth in claim 16 in which said nozzle is elongated and has a length at least substantially equal to the distance between two adjacent vanes, and said nozzle extends substantially normal to adjacent portions of said vanes.

18. An energy separator as set forth in claim 16 in which said vanes are fixed to said casing.

19. An energy separator as set forth in claim 16 in which said vanes are fixed to said rotor.

20. An energy separator as set forth in claim 15 in which the last mentioned means includes means for directing said one stream in one direction relative to the axis of said rotor and for directing said another stream in the direction opposite to said one direction.

21. An energy separator as set forth in claim 15 in which the last mentioned means includes means for directing said streams at least initially so that each has a velocity component in the same direction relative to the axis of said rotor.

22. An energy separator for forming at least two streams at different energy levels by the direct transfer of energy between portions of an initial fluid flow independently of viscous stresses and dissipative transport processes, comprising a substantially cylindrical casing, a rotor in said casing having its peripheral surface forming an annular space with the interior surface of said casing, said rotor being rotatable about its axis in a plane of rotation normal thereto, at least one elongated nozzle on said rotor affording communication between the interior thereof and said annular space, a conduit communicating with the interior of said rotor and adapted for connection to a source of said initial fluid under pressure, an array of a plurality of spaced substantially mutually parallel vanes disposed about said rotor in said annular space and fixed to said casing, intermediate portions of said vanes overlapping the annular path described by said nozzle upon rotation of said rotor and extending inclined to the plane of rotation of said rotor, the opposite end portions of each of said vanes extending substantially parallel to said axis, the exit of said nozzle extending substantially normal to said intermediate portions of said vanes, and means extending axially on opposite sides of said rotor and communicating with said annular space for receiving and advancing in opposite directions along said axis oppositely directed streams formed from said initial flow.

23. An energy separator for forming at least two streams at different energy levels by the direct transfer of energy between portions of an initial fluid flow independently of viscous stresses and dissipative transport processes, comprising a substantially cylindrical casing, a rotor in said casing having its peripheral surface forming an annular space with the interior surface of said casing, said rotor being rotatable about its axis in a plane of rotation normal thereto, a conduit communicating with the interior of said rotor and adapted for connection to a source of said initial fluid under pressure, an array of a plurality of spaced substantially mutually parallel vanes fixed to the peripheral surface of said rotor and extending in said annular space in close spaced relation with the interior of said casing, a plurality of elongated nozzles on said rotor one for each of the spaces between said vanes and affording communication between the interior thereof and said annular space, said vanes extending inclined to the plane of rotation of said rotor, and said nozzles extending substantially normal to said vanes, means extending axially on opposite sides of said rotor and communicating with said annular space for receiving and advancing in opposite directions along said axis oppositely directed streams formed from said initial flow, and straightening means adjacent the opposite sides of said rotor for directing said oppositely directed streams in opposite directions along said axis.

24. An energy separator for forming at least two streams at different energy levels by the direct transfer of energy between portions of an initial fluid flow independently of viscous stresses and dissipative transport processes, comprising a substantially cylindrical casing, a rotor in said casing and coaxial therewith, said rotor being rotatable in a plane extending substantially normal to its axis, at least one nozzle on said rotor inclined in one direction to said plane of rotation and opening in a predetermined direction along the axis of said rotor so that a stream ejected therethrough drives said rotor in a given direction, at least another nozzle on said rotor inclined in the direction opposite to said one direction to said plane of rotation and opening in the direction relative to said rotor axis opposite to said predetermined direction for ejecting another stream with a velocity component in the direction of said given direction, said nozzles providing communication between the interior of said rotor and spaces within said casing on opposite sides of said rotor, said one nozzle having an effective cross-sectional area substantially greater than that of said another nozzle, and means communicating with the interior of said rotor and adapted for connection to a source of said initial fluid flow under pressure.

25. An energy separator for forming at least two streams at different energy levels by the direct transfer of energy between portions of an initial fluid flow independently of viscous stresses and dissipative transport processes, comprising a substantially cylindrical casing, a rotor in said casing and coaxial therewith, said rotor having a plane of rotation extending substantially normal to its axis, at least one nozzle on said rotor displaced to one side of said plane of rotation and having a predetermined effective cross-sectional area with its opening disposed a predetermined distance from the rotor axis to drive said rotor in a given direction, at least another nozzle on said rotor displaced to the opposite side of said plane of rotation and having an effective cross-sectional area less than said predetermined area with its opening disposed a distance from the rotor axis less than said predetermined distance for ejecting another stream with a velocity component in the direction of said given direction, means for receiving and separately advancing therealong streams ejected by said nozzles, said nozzles communicating with the interior of said rotor, and means communicating with the interior of said rotor and adapted for connection to a source of said initial fluid flow under pressure.

26. An energy separator for forming two streams at different energy levels by the direct transfer of energy between portions of an initial fluid flow independently of viscous stresses and dissipative transport processes, comprising a casing having a passageway adapted for connection to a source of an initial fluid flow under pressure, a rotor in said casing, first and second arrays of a plurality of vanes carried on said rotor and rotatable therewith transversely relative to said passageway, the vanes of one array being spaced radially outward on said rotor relative to the vanes of the other array, partition means extending between said arrays and along said passageway downstream from said rotor forming radially inner and outer spaces in said passageway, the vanes of said first array being inclined in one direction relative to the axis of rotation of said rotor and the vanes of said second array being inclined in the direction opposite to said one direction, whereby one portion of said initial fluid flow on passing between the vanes of said first array is deflected in said one direction and drives said rotor in said opposite direction and another portion of said fluid flow is deflected by the vanes of said second array in said opposite direction.

27. An energy separator as set forth in claim 26 in which a third array of fixed vanes is positioned upstream and adjacent to said first array with the vanes in said third array inclined in said opposite direction, whereby said one portion of said initial fluid flow on passing between the vanes of said third array is deflected in said opposite direction, and a fourth array of fixed vanes is positioned upstream and adjacent to said second array with the vanes of said fourth array inclined in said one direction whereby said other portion of said initial fluid flow is deflected by the vanes of said fourth array in said one direction.

28. An energy separator as set forth in claim 27 in which straightening means are positioned in said inner and outer spaces downstream from said first and second arrays for deflecting said portions of said initial fluid flow toward their initial direction.

29. In a temperature modifying system in which two streams are formed having a temperature differential between them by the direct transfer of energy in a first frame of reference between portions of an initial fluid flow independent of viscous stresses and dissipative transport processes, means for feeding in said first frame of reference an initial flow under pressure along a predetermined path, means along said path for confining and controlling said initial flow so as to constantly form a plurality of separate streams therefrom with said streams and said initial flow at least at the points where said streams diverge from said initial flow forming a flow field in which said streams are differently directed and in which the flow velocities relative to a second frame of reference moving in a predetermined direction relative to said first frame of reference are substantially invariant with respect to time at all said points which are fixed in space in said second frame of reference, the particles in at least one of said streams having in said second frame of reference a velocity component in the direction opposite to said predetermined direction and the particles in at least another of said streams having in said second frame of reference a velocity component in said predetermined direction, means responsive to the difference between the reactions of said one and said other of said streams for sustaining motion of said flow field relative to said first frame of reference, whereby in said first frame of reference the kinetic energies of the particles of said one of said streams and of the other of said streams are lower and higher respectively than in said second frame of reference so that in said first frame of reference energy is transferred from the portion of said initial flow that forms said one of said streams to the portion of said initial flow that forms the other of said streams with a consequent gain in temperature by the latter and loss in temperature by the former independently of mixing, diffusion and heat transfer therebetween.

30. A temperature modifying system as set forth in claim 29 in which said initial fluid flow feeding means comprises on air compressor, means including a turbine for driving said compressor, and means for feeding said other stream to said turbine for driving the same.

31. A temperature modifying system as set forth in claim 30 in which said other stream feeding means includes means for further energizing said other stream.

32. A temperature modifying system as set forth in claim 29 in which said initial fluid flow feeding means comprises an air compressor having an inlet for receiving air at a given temperature and presure and an outlet for delivering air at a higher temperature and pressure, a conduit connected to said outlet, heat exchange means in good heat transfer relation with the air in said conduit and with a cooling flow external to said conduit, means for reheating and leading said one stream to said compressor inlet, and means for leading said other stream into said cooling flow for driving the same.

References Cited
UNITED STATES PATENTS

| | | | |
|---|---|---|---|
| 2,581,168 | 1/1952 | Bramley | 62—5 |
| 3,060,685 | 10/1962 | Tonnies | 60—35.6 |
| 3,144,211 | 8/1964 | Goldman | 239—532 |
| 3,169,746 | 2/1965 | Moosmann | 253—24 |

FOREIGN PATENTS

| | | |
|---|---|---|
| 682,469 | 11/1952 | Great Britain. |
| 481,696 | 12/1953 | Italy. |

DONLEY J. STOCKING, *Primary Examiner.*

LAURENCE V. EFNER, ROBERT M. WALKER, WILLIAM L. FREEH, *Examiners.*